US012680513B2

(12) United States Patent
Ricci et al.

(10) Patent No.: US 12,680,513 B2
(45) Date of Patent: Jul. 14, 2026

(54) UNCONTROLLABLE HIGH THRUST (UHT) PROTECTION FOR HYBRID-ELECTRIC AIRCRAFT PROPULSION SYSTEMS

(71) Applicant: Pratt & Whitney Canada Corp., Longueuil (CA)

(72) Inventors: Thomas Trevor Ricci, Pointe-Claire (CA); Michael R. Mark, Montreal (CA); Remi Robache, Montreal (CA); Antwan Shenouda, Mississauga (CA); James Jarvo, Long Sault (CA); Michael Hanna, Beaconsfield (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 19/005,525

(22) Filed: Dec. 30, 2024

(65) Prior Publication Data

US 2026/0185492 A1 Jul. 2, 2026

(51) Int. Cl.
| *F02C 9/48* | (2006.01) |
| *B64D 27/33* | (2024.01) |
(Continued)

(52) U.S. Cl.
CPC ................. *F02C 9/48* (2013.01); *B64D 27/33* (2024.01); *H02H 7/08* (2013.01); *B64D 31/06* (2013.01);
(Continued)

(58) Field of Classification Search
CPC ........... F02C 9/48; B64D 27/33; B64D 31/06; H02H 7/08; F05D 2220/76; F05D 2270/021
See application file for complete search history.

(56) References Cited

U.S. PATENT DOCUMENTS 10,006,375 B1 6/2018 Wagner
10,487,752 B2 * 11/2019 Fiedler ..................... F02C 9/46
(Continued)

FOREIGN PATENT DOCUMENTS

CN 117967460 A 5/2024

OTHER PUBLICATIONS

EP Search Report for EP Patent Application No. 25226611.9 dated Jun. 11, 2026.

*Primary Examiner* — Hoang M Nguyen
(74) *Attorney, Agent, or Firm* — Getz Balich LLC

(57) ABSTRACT

A propulsion system includes a propulsor, an engine, an electrical assembly, a controller, and an uncontrollable high thrust (UHT) protection assembly. The engine includes a fuel system. The engine is coupled with the propulsor. The fuel system includes a fuel control unit. The electrical assembly includes an electric motor and a motor control unit. The electric motor is coupled with the propulsor. The motor control unit is electrically connected with the electric motor. The controller includes a first controller channel. operable to control the fuel control unit to direct fuel to the combustor and to control the motor control unit to direct electrical power to the electric motor. The UHT protection assembly includes a first protection circuit operable to identify a presence or an absence of a UHT condition of the propulsor and, in response, generate a shutdown signal for the fuel control unit and the motor control unit.

20 Claims, 5 Drawing Sheets

(51) Int. Cl.
    *B64D 31/06*         (2024.01)
    *H02H 7/08*          (2006.01)

(52) U.S. Cl.
    CPC .... *F05D 2220/76* (2013.01); *F05D 2270/021*
                                  (2013.01)

(56)                   References Cited

U.S. PATENT DOCUMENTS

| | | |
|---|---|---|
| 11,167,858 B2 | 11/2021 | Terwilliger |
| 11,597,526 B2 | 3/2023 | Mark |
| 11,618,580 B2 | 4/2023 | Zatorski |
| 11,649,038 B2 | 5/2023 | Mark |
| 11,725,580 B2 | 8/2023 | Muldoon |
| 11,760,495 B2 | 9/2023 | Mark |
| 11,852,083 B2 | 12/2023 | Chahal |
| 11,873,110 B2 | 1/2024 | Hon |
| 11,964,750 B2 | 4/2024 | Zakucia |
| 12,031,479 B2 | 7/2024 | Hiett |
| 12,110,125 B2 | 10/2024 | Mark |
| 2016/0178464 A1 | 6/2016 | Burns |
| 2020/0080497 A1* | 3/2020 | Syed ................... F02C 9/28 |
| 2020/0290742 A1* | 9/2020 | Kumar ................ B64D 27/35 |
| 2020/0339268 A1* | 10/2020 | Mark ................... B64C 11/00 |
| 2021/0354837 A1* | 11/2021 | Mark ................. H02H 7/0833 |
| 2021/0354840 A1* | 11/2021 | Mark ................... F02C 9/28 |
| 2023/0122557 A1 | 4/2023 | Grzedzinski |
| 2024/0113513 A1 | 4/2024 | Syed |
| 2024/0271547 A1 | 8/2024 | Syed |

* cited by examiner

UNCONTROLLABLE HIGH THRUST (UHT) PROTECTION FOR HYBRID-ELECTRIC AIRCRAFT PROPULSION SYSTEMS

TECHNICAL FIELD

This disclosure relates generally to hybrid-electric aircraft propulsion systems and, more particularly, to uncontrollable high thrust protection for hybrid-electric aircraft propulsion systems.

BACKGROUND OF THE ART

Hybrid-electric propulsion systems for aircraft may typically include one or more electric motors configured to supplement or replace a propulsion system engine (e.g., a gas turbine engine, an intermittent combustion engine, etc.) output to one or more propulsors. Various systems and methods for controlling and providing protective functions for these hybrid-electric aircraft propulsion systems are known. While these known systems and methods may be suitable for their intended purposes, there is always room in the art for improvement.

SUMMARY

According to an aspect of the present disclosure, a propulsion system for an aircraft includes a propulsor, an engine, an electrical assembly, an engine controller, a sensor assembly, and an uncontrollable high thrust (UHT) protection assembly. The engine includes an engine output shaft, a combustor, and a fuel system. The engine output shaft is coupled with the propulsor. The fuel system is connected in fluid communication with the combustor. The fuel system includes a fuel control unit operable to control fuel flow from the fuel system to the combustor. The electrical assembly includes an electric motor and a motor control unit. The electric motor is coupled with the propulsor. The motor control unit is electrically connected with the electric motor. The engine controller includes a first controller channel. The first controller channel includes a first processing system. The first processing system is operable to control the fuel control unit to direct fuel to the combustor and to control the motor control unit to direct electrical power to the electric motor. The sensor assembly includes at least one propulsor sensor. The UHT protection assembly includes a first protection circuit of the first controller channel. The first protection circuit is connected in signal communication with the at least one propulsor sensor. The first protection circuit is operable to identify a presence or an absence of a UHT condition of the propulsor in response to one or both of a propulsor rotation speed or a propulsor torque from the at least one propulsor sensor and, in response to identifying the presence of the UHT condition, generate a shutdown signal for the fuel control unit and the motor control unit. The presence of the UHT condition is identified by the first protection circuit where the one or both of the propulsor rotation speed or the propulsor torque is greater than a respective UHT threshold value.

In any of the aspects or embodiments described above and herein, the respective UHT threshold value may be between 110 percent and 150 percent of the one or both of the propulsor rotation speed or the propulsor torque.

In any of the aspects or embodiments described above and herein, the respective UHT threshold value may be between 120 percent and 130 percent of the one or both of the propulsor rotation speed or the propulsor torque.

In any of the aspects or embodiments described above and herein, the engine controller may further include a first output circuit connected in signal communication with and between the first processing system, the first watchdog circuit, and the fuel control unit, the first output circuit may be operable to receive the shutdown signal from the first protection circuit and, in response to receiving the shutdown signal, control the fuel control unit to stop fuel flow to the combustor.

In any of the aspects or embodiments described above and herein, the motor control unit may include a motor control unit channel, the motor control unit channel may be connected in signal communication with the first processing system, the motor control unit channel may be operable to receive a control signal output from the first processing system and, in response to the received control signal output, control the motor control unit to supply electrical power to the electric motor.

In any of the aspects or embodiments described above and herein, the uncontrollable high thrust (UHT) protection assembly may include a deenergization circuit at the motor control unit, the deenergization circuit may be connected in signal communication with the first protection circuit, the deenergization circuit may be operable to receive the shutdown signal from the first protection circuit and, in response to receiving the shutdown signal, control the motor control unit to deenergize the electric motor.

In any of the aspects or embodiments described above and herein, the engine controller may further include a second controller channel including a second processing system, and the second processing system may be operable to control, in combination with the first processing system, the fuel control unit to direct fuel to the combustor.

In any of the aspects or embodiments described above and herein, the first protection circuit may be operable to generate and transmit a reset signal to the first processing system in response to identifying the presence of the UHT condition.

In any of the aspects or embodiments described above and herein, the at least one propulsor sensor may be disposed mechanically downstream of a coupling interface between the engine output shaft and the electric motor.

In any of the aspects or embodiments described above and herein, the propulsion system further may further include a gear box coupling the engine output shaft and the electric motor with the propulsor.

According to another aspect of the present disclosure, a propulsion system for an aircraft includes a propulsor, an engine, an electrical assembly, an engine controller, and an uncontrollable high thrust (UHT) protection assembly. The engine includes an engine output shaft, a combustor, and a fuel system. The engine output shaft is coupled with the propulsor. The fuel system is connected in fluid communication with the combustor. The fuel system includes a fuel control unit operable to control fuel flow from the fuel system to the combustor. The electrical assembly includes an electric motor and a motor control unit. The electric motor is coupled with the propulsor. The motor control unit is electrically connected with the electric motor. The engine controller includes a first controller channel. The first controller channel includes a first processing system. The first processing system includes a processor connected in signal communication with a non-transitory memory storing instructions which, when executed by the processor, cause the processor to generate a first control signal output for the fuel control unit to direct fuel to the combustor and generate a second control signal output for the motor control unit to direct electrical power to the electric motor. The sensor assembly includes at least one propulsor sensor. The UHT protection assembly includes a first protection circuit of the first controller channel. The first protection circuit is connected in signal communication with the at least one propulsor sensor. The first protection circuit is operable to identify a presence or an absence of a UHT condition of the propulsor in response to one or both of a propulsor rotation speed or a propulsor torque from the at least one propulsor sensor and, in response to identifying the presence of the UHT condition, generate a shutdown signal for the fuel control unit and the motor control unit overriding the first control signal output and the second control signal output. The presence of the UHT condition is identified by the first protection circuit where the one or both of the propulsor rotation speed or the propulsor torque is greater than a respective UHT threshold value.

In any of the aspects or embodiments described above and herein, the engine controller may further include a first output circuit connected in signal communication with and between the first processing system, the first watchdog circuit, and the fuel control unit, the first output circuit may be operable to receive the shutdown signal from the first protection circuit and, in response to receiving the shutdown signal, control the fuel control unit to stop fuel flow to the combustor.

In any of the aspects or embodiments described above and herein, the motor control unit may include a motor control unit channel, the motor control unit channel may be connected in signal communication with the first processing system, and the motor control unit channel may be operable to receive a control signal output from the first processing system and, in response to the received control signal output, control the motor control unit to supply electrical power to the electric motor.

In any of the aspects or embodiments described above and herein, the UHT protection assembly may include a deenergization circuit at the motor control unit, the deenergization circuit may be connected in signal communication with the first protection circuit, the deenergization circuit may be operable to receive the shutdown signal from the first protection circuit and, in response to receiving the shutdown signal, control the motor control unit to deenergize the electric motor.

In any of the aspects or embodiments described above and herein, the first protection circuit may be operable to generate and transmit a reset signal to the first processing system in response to identifying the presence of the UHT condition.

According to an aspect of the present disclosure, a propulsion system for an aircraft includes a propulsor, a gear box, an engine, an electrical assembly, an engine controller, a sensor assembly, and an uncontrollable high thrust (UHT) protection assembly. The gear box is coupled with the propulsor. The engine includes an engine output shaft, a combustor, and a fuel system. The engine output shaft is coupled with the propulsor by the gear box. The fuel system is connected in fluid communication with the combustor. The fuel system includes a fuel control unit operable to control fuel flow from the fuel system to the combustor. The electrical assembly includes an electric motor and a motor control unit. The electric motor is coupled with the propulsor by the gear box. The motor control unit is electrically connected with the electric motor. The engine controller includes a first controller channel. The first controller channel includes a first processing system. The first processing system is operable to control the fuel control unit to direct fuel to the combustor and to control the motor control unit to direct electrical power to the electric motor. The sensor assembly includes at least one propulsor sensor disposed at the propulsor. The uncontrollable high thrust (UHT) protection assembly including a first protection circuit of the first controller channel, the first protection circuit connected in signal communication with the at least one propulsor sensor, the first protection circuit operable to identify a presence or an absence of a UHT condition of the propulsor in response to one or both of a propulsor rotation speed or a propulsor torque from the at least one propulsor sensor and, in response to identifying the presence of the UHT condition, generate a shutdown signal for the fuel control unit and the motor control unit.

In any of the aspects or embodiments described above and herein, the motor control unit may include a motor control unit channel. The motor control unit channel may be connected in signal communication with the first processing system. The motor control unit channel may be operable to receive a control signal output from the first processing system and, in response to the received control signal output, control the motor control unit to supply electrical power to the electric motor.

In any of the aspects or embodiments described above and herein, the UHT protection assembly may include a deenergization circuit at the motor control unit, the deenergization circuit may be connected in signal communication with the first protection circuit, and the deenergization circuit may be operable to receive the shutdown signal from the first protection circuit and, in response to receiving the shutdown signal, control the motor control unit to deenergize the electric motor.

In any of the aspects or embodiments described above and herein, the engine controller may further include a second controller channel including a second processing system, the second processing system may be operable to control, in combination with the first processing system, the fuel control unit to direct fuel to the combustor.

In any of the aspects or embodiments described above and herein, the first protection circuit may be operable to generate and transmit a reset signal to the first processing system in response to identifying the presence of the UHT condition.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
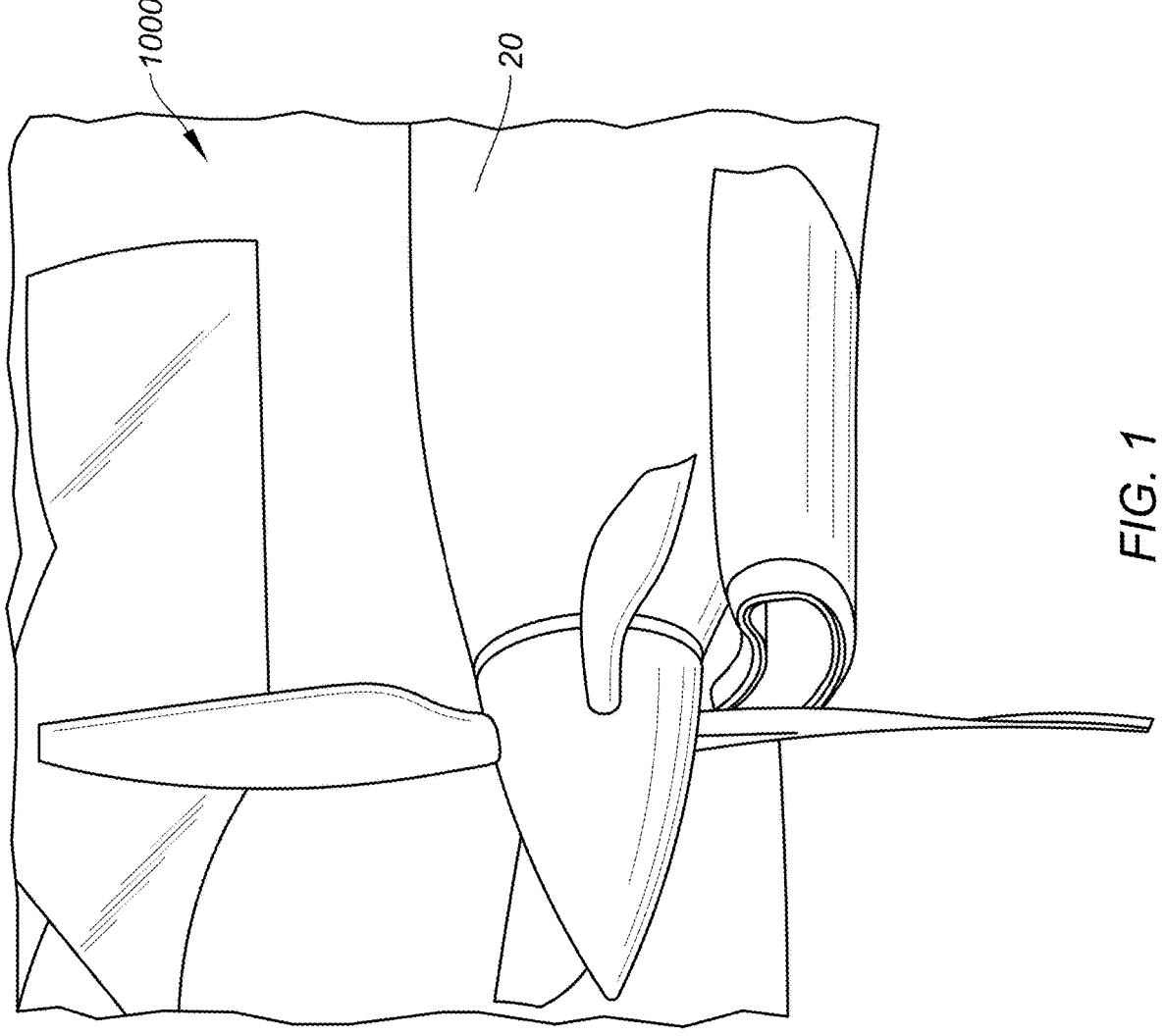
FIG. 1 illustrates an aircraft including a propulsion system, in accordance with one or more embodiments of the present disclosure.

FIG. 1 illustrates an aircraft 1000 including at least one propulsion system 20. Briefly, the aircraft may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft may be a manned aerial vehicle or an unmanned aerial vehicle (UAV, e.g., a drone).

Figure 2:
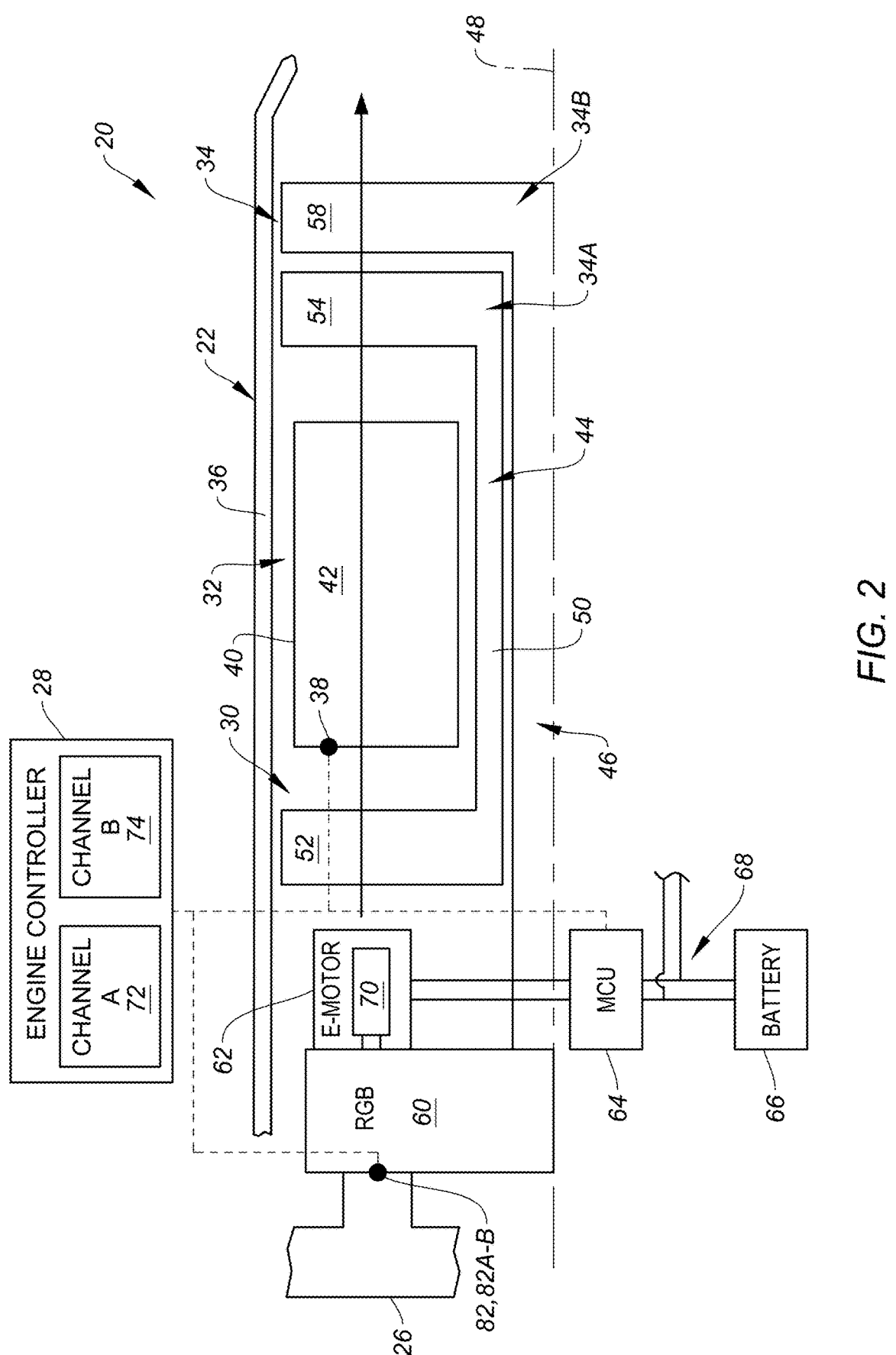
FIG. 2 schematically illustrates a cutaway, side view of an aircraft propulsion system, in accordance with one or more embodiments of the present disclosure.

FIG. 2 schematically illustrates a cutaway, side view of the propulsion system 20. The propulsion system 20 of FIG. 2 includes an engine 22, an electrical assembly 24, a propulsor 26, and an engine controller 28. The engine 22 of FIG. 2 is configured as a turboprop gas turbine engine. However, the present disclosure is not limited to any particular configuration of gas turbine engine for the propulsion system 20, and examples of gas turbine engine configurations for the propulsion system 20 may include, but are not limited to, a turbofan engine, a turbojet engine, a propfan engine, or the like. Aspects of the present disclosure may be equally applicable to aircraft propulsion systems including other engine configurations such as, but not limited to, rotary engines, piston engines, and the like, or to electric aircraft propulsion systems (e.g., battery-electric propulsion systems, fuel-cell-electric propulsion systems, etc.). Aspects of the present disclosure may also be equally applicable to aircraft engines (e.g., aircraft powerplants) which are not part of a propulsion system, for example, an engine for an auxiliary power unit (APU).

The engine 22 of FIG. 2 includes a compressor section 30, a combustor section 32, a turbine section 34, and an engine static structure 36. The combustor section 32 includes a fuel system 38, a combustor 40 (e.g., an annular combustor). The fuel system 38 is configured to store, direct, and meter a fuel flow to the combustor 40. For example, the fuel system 38 may include fuel tanks, fuel pumps, fuel lines, manifolds, injector nozzles, and the like. The fuel system 38 may additionally include a fuel control unit (FCU) configured to precisely regulate fuel flow through the fuel system 38 to the combustor 40. The combustor 40 forms a combustion chamber 42. The turbine section 34 includes a high-pressure turbine 34A and a power turbine 34B.

Components of the compressor section 30 and the turbine section 34 of FIG. 2 form a first rotational assembly 44 (e.g., a high-pressure spool) and a second rotational assembly 46 of the engine 22. The first rotational assembly 44 and the second rotational assembly 46 are mounted for rotation about a rotational axis 48 (e.g., an axial centerline) of the engine 22 relative to the engine static structure 36.

The first rotational assembly 44 includes a first shaft 50, a bladed compressor rotor 52 for the compressor section 30, and a bladed first turbine rotor 54 for the high-pressure turbine 34A. The first shaft 50 interconnects the bladed compressor rotor 52 and the bladed first turbine rotor 54.

The second rotational assembly 46 of FIG. 2 includes a second shaft 56 (e.g., an engine output shaft) and a bladed second turbine rotor 58 for the power turbine 34B. The second shaft 56 is connected to the bladed second turbine rotor 58. The second shaft 56 operably connects (e.g., directly or indirectly connects) the bladed second turbine rotor 58 with the propulsor 26. For example, the second shaft 56 of FIG. 2 is coupled with the propulsor 26 by a gear box 60 (e.g., a reduction gear box (RGB)). The gear box 60 includes a gear assembly (e.g., an epicyclic gear assembly) coupling the second shaft 56 and the propulsor 26. The gear assembly may be a reduction gear assembly configured to drive rotation of the propulsor 26 at a reduced rotational speed relative to the second shaft 56. Of course, the second shaft 56 may alternatively be directly connected to the propulsor 26 to drive the propulsor 26 at the same rotational speed as the second shaft 56.

The engine static structure 36 includes engine casings, cowlings, and other fixed (e.g., non-rotating) structures of the engine 22 which house and/or support components of the engine 22 such as, but not limited to, those of the compressor section 30, the combustor section 32, and the turbine section 34. The engine static structure 36 includes one or more bearing assemblies and/or gear trains configured to rotationally support and/or interconnect components of the first rotational assembly 44 and the second rotational assembly 46.

The electrical assembly 24 of FIG. 2 includes an electric motor 62, a motor control unit (MCU) 64, a battery 66, and an electrical distribution system 68. The electric motor 62 includes a rotor 70. The rotor 70 is coupled to the propulsor 26 by the gear box 60. For example, the gear box 60 may couple both of the second shaft 56 and the rotor 70 to the propulsor 26 to facilitate driving rotation of the propulsor 26 with the bladed second turbine rotor 58 (e.g., via the second shaft 56), the electric motor 62 (e.g., the rotor 70), or a combination of the bladed second turbine rotor 58 and the electric motor 62. The motor control unit 64 is electrically connected with and between the electric motor 62 and the electrical distribution system 68. The motor control unit 64 is configured to control electric power characteristics (e.g., frequency, voltage, current) supplied to the electric motor 62 (e.g., windings of the electric motor 62), for example, to control a rotation speed and/or torque of the rotor 70. The battery 66 is electrically connected to the electrical distribution system 68. The battery 66 is configured to selectively supply electrical power to the electrical distribution system 68 independently (e.g., as a single power source for the electrical assembly 24) or in combination with one or more other electrical power sources (e.g., an electrical generator). The battery 66 may include a plurality of battery strings, battery sub-strings, battery modules, battery cells, and/or the like electrically connected together in series and/or parallel as necessary to configure the battery 66 with the desired electrical characteristics (e.g., voltage output, current output, storage capacity, etc.) for the aircraft 1000. The present disclosure is not limited to any particular configuration of the battery 66. The battery 66 (e.g., and its battery cells) may be configured as a rechargeable battery having a battery chemistry such as, but not limited to, lead acid, nickel cadmium (NiCd), nickel-metal hydride (Ni-MH), lithium-ion (Li-ion), lithium-polymer (Li-poly), lithium metal, and the like. The electrical distribution system 68 electrically interconnects components of the electrical assembly 24. The electrical distribution system 68 includes switchgear, cables, wires, breakers, switches, contactors, electrical power conditional and/or conversion (e.g., AC to DC or DC to AC conversion) components, and/or other electrical components to effect the transfer of electrical power between components of the electrical assembly 24. The electrical distribution system 68 may additionally be electrically connected with other electric power sources (e.g., an electrical generator) of the electrical assembly 24. The electrical distribution system 68 may additionally include one or more electrical power controllers, for example, to control a magnitude and/or direction of electrical current flow to components of the electrical assembly 24.

The engine controller 28 is connected in signal communication with the fuel system 38 (e.g., the fuel system fuel control unit) and the motor control unit 64. The engine controller 28 is configured to control operating parameters of the engine 22 such as, but not limited to, fuel flow to the combustor 40, stator vane position (e.g., variable compressor inlet guide vane (IGV) position), compressor air bleed valve position, shaft (e.g., first shaft 50 and/or second shaft 56) torque and/or rotation speed, etc. so as to control an engine power or performance of the propulsion system 20. For example, the engine controller 28 may control the fuel system 38 to modulate fuel flow to the combustor 40 and/or control the motor control unit 64 to operate the electric motor 62 at a target rotation speed and/or torque or to deenergize the electric motor 62. In some embodiments, the engine controller 28 may be part of a full authority digital engine control (FADEC) system for the propulsion system 20 and its engine 22. As shown in FIG. 2, the engine controller 28 may be configured as a dual channel controller. For example, the engine controller 28 of FIG. 2 includes a first controller channel 72 ("Channel A") and a second controller channel 74 ("Channel B"). The first controller channel 72 and the second controller channel 74 may operate as a control channel and a monitoring channel, respectively. For example, the first controller channel 72 may generate control signal outputs (e.g., electronic and/or electrical control signal outputs) for the fuel system 38 and/or the motor control unit 64 while the second controller channel 74 may monitor the control signal outputs of the first controller channel 72 to confirm proper operation of the first controller channel 72. Alternatively, the first controller channel 72 and the second controller channel 74 may each operate as control channels whereby a control signal output of the engine controller 28 to the fuel system 38 and/or the motor control unit 64 requires agreement between the first controller channel 72 and the second controller channel 74. Of course, the engine controller 28 may alternatively be configured as a single channel controller (e.g., including only a single control channel configured to control the fuel system 38 and/or the motor control unit 64).

Figure 3:
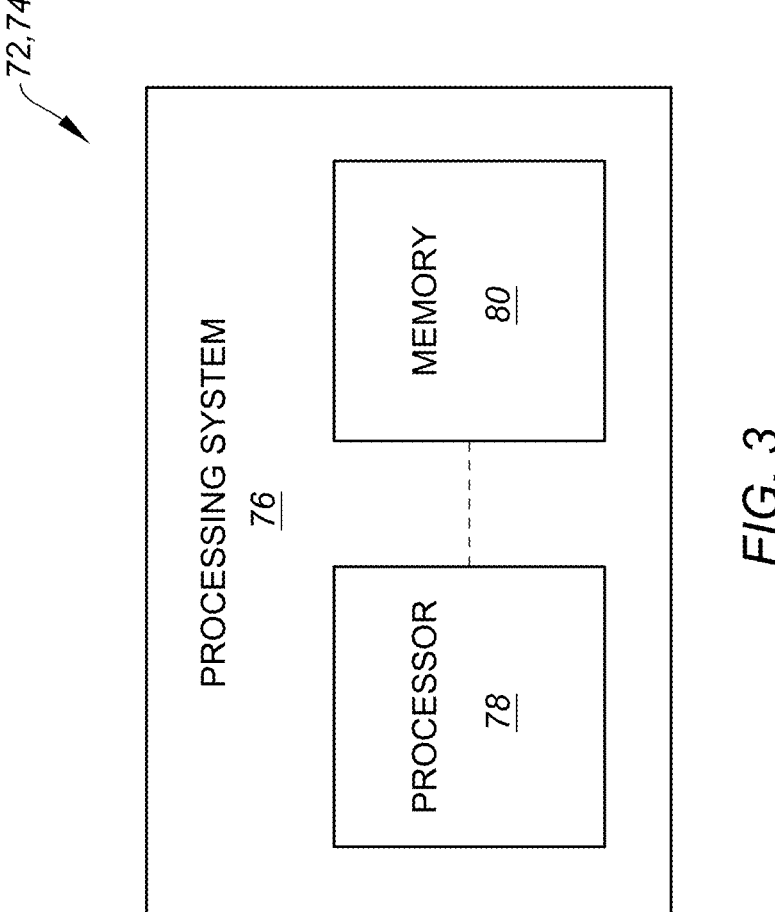
FIG. 3 schematically a controller channel for an engine controller of the aircraft propulsion system, in accordance with one or more embodiments of the present disclosure.

Referring briefly to FIG. 3, the first controller channel 72 and the second controller channel 74 each include a discrete processing system 76. The processing system 76 includes a processor 78 connected in signal communication with memory 80. The processor 78 may include any type of computing device, computational circuit, processor(s), central processing unit (CPU), graphics processing unit (GPU), computer, or the like capable of executing a series of instructions that are stored in memory 80. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The executable instructions may apply to any functionality described herein to enable the engine controller 28 (e.g., the processing system 76 and its processor 78) to accomplish the same algorithmically and/or coordination of propulsion system 20 components including the fuel system 38 and the motor control unit 64. The memory 80 may include a single memory device or a plurality of memory devices (e.g., a computer-readable storage device that can be read, written, or otherwise accessed by a general purpose or special purpose computing device, including any processing electronics and/or processing circuitry capable of executing instructions). The present disclosure is not limited to any particular type of memory device, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) may be directly and/or indirectly coupled to the engine controller 28. The processing system 76 may include, or may be in communication with, a user interface including one or more inputs devices and/or one or more output devices, for example, an input device that enables a user to enter data and/or instructions and an output device configured to display information (e.g., a visual display or a printer), or to transfer data, etc. Communications between the processing system 76 and external electrical or electronic devices may be via a hardwire connection or via a wireless connection. A person of skill in the art will recognize that portions of the processing system 76 may assume various forms (e.g., digital signal processor, analog device, etc.).

The engine controller 28 may include or otherwise be connected in signal communication with a sensor assembly 82 of the propulsion system 20 (e.g., the engine 22). For example, the first controller channel 72 and the second controller channel 74 may each be connected to sensors of the sensor assembly 82 to receive outputs therefrom representative of operational parameters of the propulsion system 20 and its engine 22. Among other sensors, the sensor assembly 82 of FIG. 2 includes a propulsor rotation speed sensor 82A and a propulsor torque sensor 82B. The first controller channel 72 and the second controller channel 74 may each be connected in signal communication with the propulsor rotation speed sensor 82A and the propulsor torque sensor 82B. In some embodiments, the sensor assembly 82 may include a discrete propulsor rotation speed sensors 82A and a discrete propulsor torque sensors 82B for each of the first controller channel 72 and the second controller channel 74 (e.g., to form independent sensing and control lanes for the engine controller 28). The propulsor rotation speed sensor 82A and the propulsor torque sensor 82B should be understood as mechanically downstream of a coupling interface between the engine 22 (e.g., the second shaft 56) and the electric motor 62 (e.g., the rotor 70). For example, the propulsor rotation speed sensor 82A and the propulsor torque sensor 82B may be arranged to measure propulsor 26 rotation speed and propulsor 26 torque, respectively, at (e.g., on, adjacent, or proximate) the propulsor 26 or an output of the gear box 60.

During operation of the propulsion system 20 of FIG. 2, ambient air enters the propulsion system 20 through an air intake into and through a core flow path of the engine 22. The ambient air flow along the core flow path is compressed in the compressor section 30, by rotation of the bladed compressor rotor 52, and directed into the combustor 40. Fuel injected by the fuel system 38 into the combustor 40 is mixed with the compressed air to provide a fuel-air mixture. This fuel-air mixture is combusted in the combustion chamber 42, and the resultant combustion gas is directed through the high-pressure turbine 34A and the power turbine 34B and subsequently exhausted from the propulsion system 20. The bladed first turbine rotor 54 and the bladed second turbine rotor 58 rotationally drive the first rotational assembly 44 and the second rotational assembly 46, respectively, in response to the combustion gas flow through the high-pressure turbine 34A and the power turbine 34B. The second rotational assembly 46 (e.g., the second shaft 56) may drive rotation of the propulsor 26, for example, through the gear box 60. The electric motor 62 may be selectively operated (e.g., by the engine controller 28) to drive rotation of the propulsor 26 independently or in combination with the engine 22 through the gear box 60.

In some embodiments, the propulsor 26 may be configured with a constant-speed propeller (also known as a variable-pitch propeller). The constant-speed propeller may be controlled (e.g., by the engine controller 28) to maintain a substantially constant rotation speed (irrespective of the propulsor 26 torque) by modulating a pitch of the propeller's blades, thereby controlling a thrust output of the propulsion system 20 while maintaining the rotation speed of the propulsor 26 substantially constant. Alternatively, the engine controller 28 may modulate a rotation speed of the propulsor 26 (e.g., a fixed-pitch propeller) to control a thrust output of the propulsion system 20.

During propulsion system 20 operation (e.g., during take-off, cruise, descent, etc.), the engine controller 28 controls the fuel system 38 and the motor control unit 64 to achieve a target thrust characterized, for example, by a target propulsor 26 torque and/or rotation speed. Propulsor uncontrollable high thrust (UHT) is a phenomenon where, for example, a rotation speed of the propulsor exceeds a target rotation speed and/or a maximum allowable rotation speed and/or a torque of the propulsor exceeds a target torque and/or a maximum allowable torque. Under UHT conditions, the propulsor may experience an increased risk of damage (e.g., propeller blade release) due to excessive centrifugal forces. UHT conditions may also cause the blade tips of the propulsor to exceed the speed of sound, thereby leading to increased propulsor energy consumption with no meaningful increase in thrust. Excessive or prolonged propulsor UHT conditions may also lead to engine vibration and/or damage, airframe vibration and/or damage, and/or loss of aircraft control. For example, engine bearings may be expected to seize after a period of operation above the rated rotation speed and/or rated torque for the engine. Propulsor UHT conditions may, in some rare, cases, be caused by a control failure (e.g., an electronic control failure of an electronic control system such as an engine controller or a motor control unit) which leads to the propulsion system engine or electric motor operating at an output (e.g., a rotation speed and/or torque output) which is higher than commanded (e.g., by a pilot). UHT conditions may progress rapidly, such that timely response by a pilot or other operator may be difficult, and it may not be immediately clear whether the propulsion system engine or the electric motor is driving the UHT condition.

Figure 4:
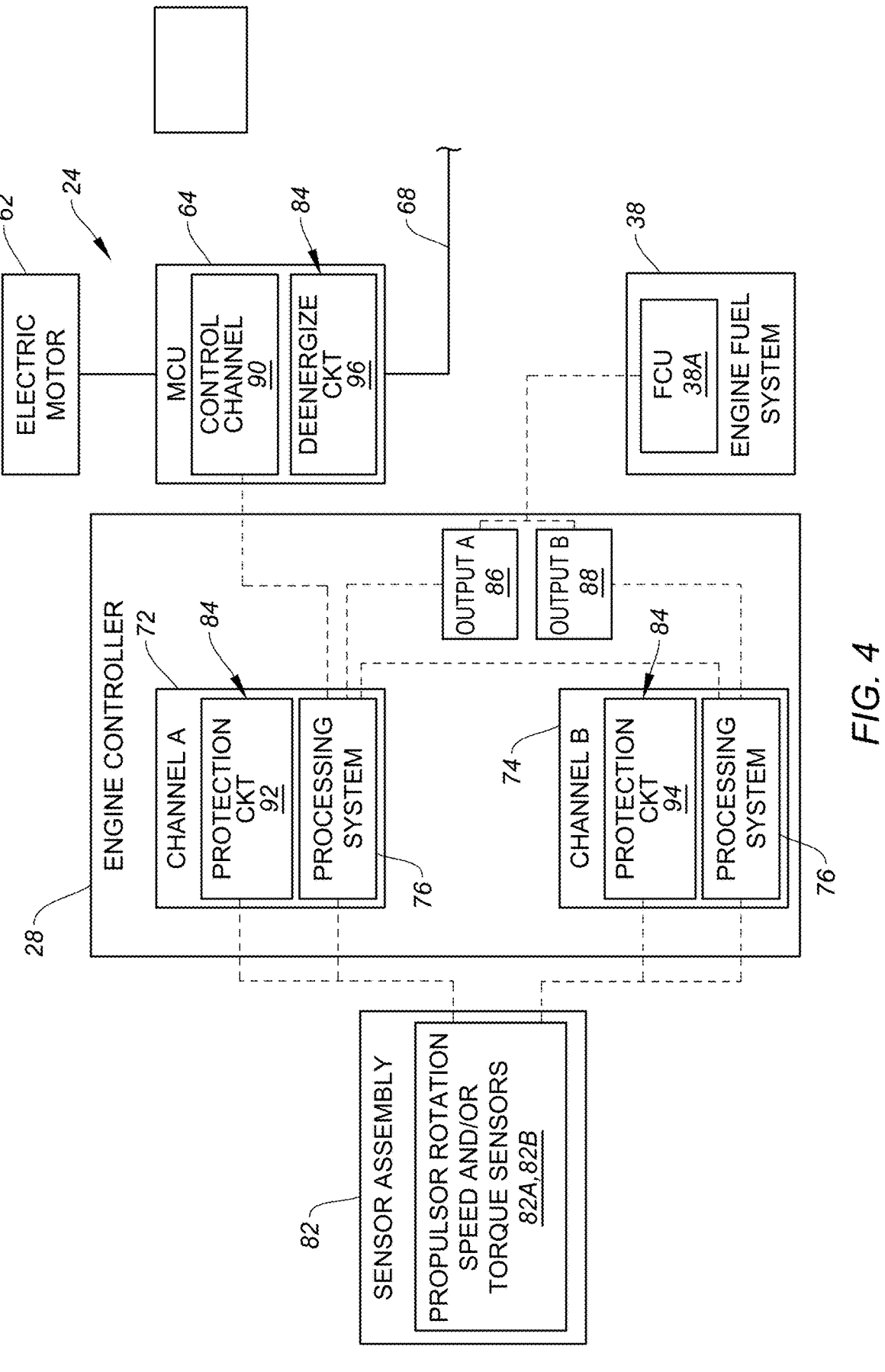
FIG. 4 schematically illustrates a portion of an uncontrollable high thrust (UHT) electronic protection assembly for the aircraft propulsion system, in accordance with one or more embodiments of the present disclosure.
Figure 5:
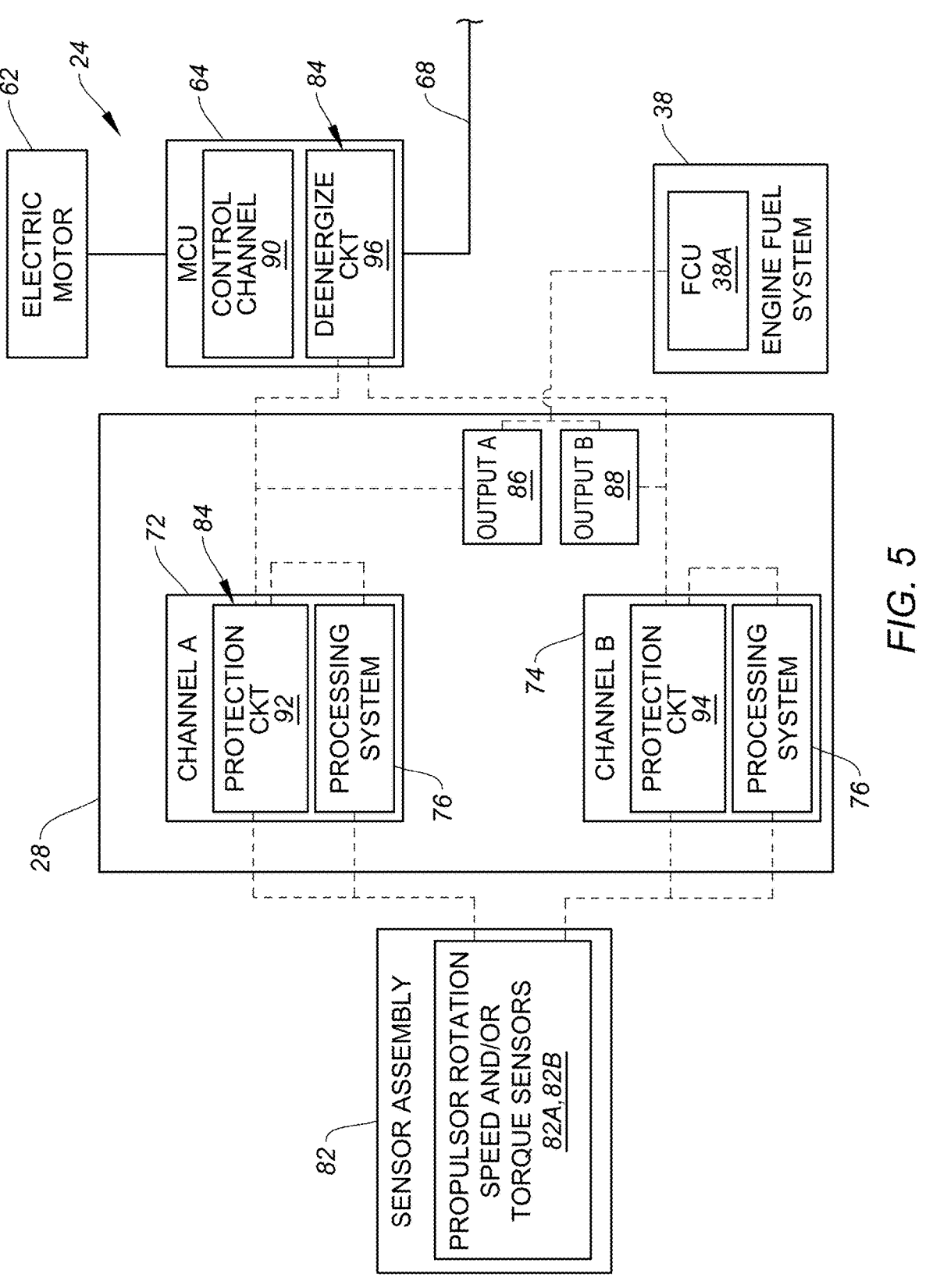
FIG. 5 schematically illustrates another portion of the UHT electronic protection assembly of FIG. 4, in accordance with one or more embodiments of the present disclosure.

FIGS. 4 and 5 schematically illustrate portions of the engine controller 28 and the motor control unit 64 in greater detail. FIGS. 4 and 5 further schematically illustrate a UHT electronic protection assembly 84 for the engine controller 28 and the motor control unit 64. FIG. 4 schematically illustrates an exemplary control architecture and signal paths associated with normal operation of the engine controller 28 to control propulsor 26 thrust by operation of the engine fuel system 38 and the motor control unit 64. FIG. 5 schematically illustrates the control architecture and signal paths of the UHT electronic protection assembly 84 relevant to its UHT protective functions.

The engine controller 28 of FIGS. 4 and 5 includes a first output circuit 86 and a second output circuit 88. The first output circuit 86 is connected in signal communication with the processing system 76 of the first controller channel 72. The second output circuit 88 is connected in signal communication with the processing system 76 of the second controller channel 74. The first output circuit 86 and the second output circuit 88 are operable to receive the control signal outputs of the first controller channel 72 and the second controller channel 74, respectively, and in response to the received control signal outputs, generate a control signal (e.g., an analog control signal) output to control a fuel control unit (FCU) 38A of the fuel system 38 to supply fuel to the combustor 40.

The motor control unit 64 of FIGS. 4 and 5 includes an MCU control channel 90. The MCU control channel 90 of FIGS. 4 and 5 is connected in signal communication with the first controller channel 72 (e.g., the processing system 76). The MCU control channel 90 is operable to receive the control signal outputs (e.g., a target electric motor 62 rotation speed and/or torque) of the first controller channel 72 and, in response to the received control signal outputs, control the motor control unit 64 to supply electrical power to the electric motor 62 with electric power characteristics (e.g., frequency, voltage, current) consistent with the control signal outputs of the first controller channel 72 (including deenergizing the electric motor 62). For example, the MCU control channel 94 may include or otherwise be formed by a digital signal processor (DSP) circuit operable to control the motor control unit 64 to supply electrical power to the electric motor 62 with electric power characteristics (e.g., frequency, voltage, current) consistent with the motor control signal output of the engine controller 28.

The UHT electronic protection assembly 84 of FIGS. 4 and 5 includes a first protection circuit 92 for the first controller channel 72, a second protection circuit 94 for the second controller channel 74, and a deenergization circuit 96 for the motor control unit 64. The first protection circuit 92 and the second protection circuit 94 are connected in signal communication with the propulsor rotation speed sensor 82A and/or the propulsor torque sensor 82B. The first protection circuit 92 and the second protection circuit 94 are connected in signal communication with the deenergization circuit 96. The first protection circuit 92 is connected in signal communication with the processing system 76 (e.g., the processor 78) of the first controller channel 72 and the first output circuit 86. The second protection circuit 94 is connected in signal communication with the processing system 76 (e.g., the processor 78) of the second controller channel 74 and the second output circuit 88. The protection circuits 92, 94 may be configured, for example, as watchdog timer (WDT) circuits. The deenergization circuit 96 is operable to control the motor control unit 64 to isolate electrical power (e.g., deenergize) the electric motor 62. The deenergization circuit 96 is operable to control the motor control unit 64 to deenergize the electric motor 62 independent of the MCU control channel 90 or any control signal output from the first controller channel 72 to the MCU control channel 90. In other words, the deenergization circuit 96 may override the MCU control channel 90, in response to a shutdown signal from the first protection circuit 92 or the second protection circuit 94 to deenergize the electric motor 62. For example, the deenergization circuit 96 may include a field-programmable gate array (FPGA) circuit configured to receive the shutdown signal from the first protection circuit 92 or the second protection circuit 94 and, in response, control the motor control unit 64 to deenergize the electric motor 62.

The first protection circuit 92 and the second protection circuit 94 (e.g., watchdog timer circuits) are each operable to identify a presence or an absence of a UHT condition of the propulsor 26. The first protection circuit 92 and the second protection circuit 94 may each compare a measured propulsor rotation speed input from the propulsor rotation speed sensor 82A to a propulsor rotation speed threshold. The first protection circuit 92 and the second protection circuit 94 may (e.g., independently) identify the presence of the UHT condition where the measured propulsor rotation speed input is greater than the propulsor rotation speed threshold or the absence of the UHT condition where the measured propulsor rotation speed input is less than the propulsor rotation speed threshold. Additionally or alternatively, the first protection circuit 92 and the second protection circuit 94 may each compare a measured propulsor torque input from the propulsor torque sensor 82B to a propulsor torque threshold. The first protection circuit 92 and the second protection circuit 94 may (e.g., independently) identify the presence of the UHT condition where the measured propulsor torque input is greater than the propulsor torque threshold or the absence of the UHT condition where the measured propulsor torque input is less than the propulsor torque threshold. The propulsor rotation speed threshold and the propulsor torque threshold may be expressed in terms of a rated propulsor rotation speed (e.g., a manufacturer-determined maximum operational rotation speed) and a rated propulsor torque (e.g., a manufacturer-determined maximum operational torque), respectively. The propulsor rotation speed threshold and the propulsor torque threshold applied by the first protection circuit 92 and the second protection circuit 94 may typically be greater than the rated propulsor rotation speed and the rated propulsor torque, respectively, to facilitate protective functions directed to excessive UHT conditions. For example, the propulsor rotation speed threshold and the propulsor torque threshold may be between 110 percent and 150 percent of the rated propulsor rotation speed and the rated propulsor torque, respectively, or more particularly, between 120 percent and 130 percent of the rated propulsor rotation speed and the rated propulsor torque, respectively.

In response to identification of the UHT condition by the first protection circuit 92, the first protection circuit 92 may generate and transmit a shutdown signal to the first output circuit 86 and the deenergization circuit 96. In response to receiving the shutdown signal from the first protection circuit 92, the first output circuit 86 is operable to generate a control signal (e.g., an analog control signal) output to control the fuel control unit 38A to stop fuel flow to the combustor 40, thereby shutting down the engine 22. Similarly, in response to receiving the shutdown signal from the first protection circuit 92, the deenergization circuit 96 is operable to control the motor control unit 64 to deenergize the electric motor 62. In other words, the shutdown signal from the first protection circuit 92 may override any control signal output from the first controller channel 72 for controlling operation of the fuel control unit 38A and/or the motor control unit 64, to facilitate engine 22 and electric motor 62 shutdown independent of the processing system 76 of the first controller channel 72. In response to identification of the UHT condition, the first protection circuit 92 may additionally generate and transmit a reset signal to the processing system 76 of the first controller channel 72, for example, to facilitate automated correction of a temporary hardware or software fault.

In response to identification of the UHT condition by the second protection circuit 94, the second protection circuit 94 may generate and transmit a shutdown signal to the second output circuit 88 and the deenergization circuit 96. In response to receiving the shutdown signal from the second protection circuit 94, the second output circuit 88 is operable to generate a control signal (e.g., an analog control signal) output to control the fuel control unit 38A to stop fuel flow to the combustor 40, thereby shutting down the engine 22. Similarly, in response to receiving the shutdown signal from the second protection circuit 94, the deenergization circuit 96 is operable to control the motor control unit 64 to deenergize the electric motor 62. In other words, the shutdown signal from the first protection circuit 92 may override any control signal output from the second controller channel 74 for controlling operation of the fuel control unit 38A and/or the motor control unit 64, to facilitate engine 22 and electric motor 62 shutdown independent of the processing system 76 of the second controller channel 74. In response to identification of the UHT condition, the second protection circuit 94 may additionally generate and transmit a reset signal to the processing system 76 of the second controller channel 74, for example, to facilitate automated correction of a temporary hardware or software fault.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims, and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A propulsion system for an aircraft, the propulsion system comprising:
a propulsor;
an engine including an engine output shaft, a combustor, and a fuel system, the engine output shaft coupled with the propulsor, the fuel system connected in fluid communication with the combustor, the fuel system including a fuel control unit operable to control fuel flow from the fuel system to the combustor;
an electrical assembly including an electric motor and a motor control unit, the electric motor coupled with the propulsor, the motor control unit electrically connected with the electric motor;
an engine controller including a first controller channel, the first controller channel includes a first processing system, the first processing system operable to control the fuel control unit to direct fuel to the combustor and to control the motor control unit to direct electrical power to the electric motor;
a sensor assembly including at least one propulsor sensor; and
an uncontrollable high thrust (UHT) protection assembly including a first protection circuit of the first controller channel, the first protection circuit connected in signal communication with the at least one propulsor sensor, the first protection circuit operable to identify a presence or an absence of a UHT condition of the propulsor in response to one or both of a propulsor rotation speed or a propulsor torque from the at least one propulsor sensor and, in response to identifying the presence of the UHT condition, generate a shutdown signal for the fuel control unit and the motor control unit, the presence of the UHT condition identified by the first protection circuit where the one or both of the propulsor rotation speed or the propulsor torque is greater than a respective UHT threshold value.

2. The propulsion system of claim 1, wherein the respective UHT threshold value is between 110 percent and 150 percent of the one or both of the propulsor rotation speed or the propulsor torque.

3. The propulsion system of claim 2, wherein the respective UHT threshold value is between 120 percent and 130 percent of the one or both of the propulsor rotation speed or the propulsor torque.

4. The propulsion system of claim 1, wherein the engine controller further includes a first output circuit connected in signal communication with and between the first processing system, the first watchdog circuit, and the fuel control unit, the first output circuit operable to receive the shutdown signal from the first protection circuit and, in response to receiving the shutdown signal, control the fuel control unit to stop fuel flow to the combustor.

5. The propulsion system of claim 1, wherein the motor control unit includes a motor control unit channel, the motor control unit channel is connected in signal communication with the first processing system, the motor control unit channel is operable to receive a control signal output from the first processing system and, in response to the received control signal output, control the motor control unit to supply electrical power to the electric motor.

6. The propulsion system of claim 5, wherein the uncontrollable high thrust (UHT) protection assembly includes a deenergization circuit at the motor control unit, the deenergization circuit is connected in signal communication with the first protection circuit, the deenergization circuit is operable to receive the shutdown signal from the first protection circuit and, in response to receiving the shutdown signal, control the motor control unit to deenergize the electric motor.

7. The propulsion system of claim 1, wherein the engine controller further includes a second controller channel including a second processing system, the second processing system operable to control, in combination with the first processing system, the fuel control unit to direct fuel to the combustor.

8. The propulsion system of claim 1, wherein the first protection circuit is operable to generate and transmit a reset signal to the first processing system in response to identifying the presence of the UHT condition.

9. The propulsion system of claim 1, wherein the at least one propulsor sensor is disposed mechanically downstream of a coupling interface between the engine output shaft and the electric motor.

10. The propulsion system of claim 1, wherein the propulsion system further includes a gear box coupling the engine output shaft and the electric motor with the propulsor.

11. A propulsion system for an aircraft, the propulsion system comprising:

a propulsor;

an engine including an engine output shaft, a combustor, and a fuel system, the engine output shaft coupled with the propulsor, the fuel system connected in fluid communication with the combustor, the fuel system including a fuel control unit operable to control fuel flow from the fuel system to the combustor;

an electrical assembly including an electric motor and a motor control unit, the electric motor coupled with the propulsor, the motor control unit electrically connected with the electric motor;

an engine controller including a first controller channel, the first controller channel including a first processing system, the first processing system including a processor connected in signal communication with a non-transitory memory storing instructions which, when executed by the processor, cause the processor to:

generate a first control signal output for the fuel control unit to direct fuel to the combustor, and generate a second control signal output for the motor control unit to direct electrical power to the electric motor;

a sensor assembly including at least one propulsor sensor; and an uncontrollable high thrust (UHT) protection assembly including a first protection circuit of the first controller channel, the first protection circuit connected in signal communication with the at least one propulsor sensor, the first protection circuit operable to identify a presence or an absence of a UHT condition of the propulsor in response to one or both of a propulsor rotation speed or a propulsor torque from the at least one propulsor sensor and, in response to identifying the presence of the UHT condition, generate a shutdown signal for the fuel control unit and the motor control unit overriding the first control signal output and the second control signal output, the presence of the UHT condition identified by the first protection circuit where the one or both of the propulsor rotation speed or the propulsor torque is greater than a respective UHT threshold value.

12. The propulsion system of claim 11, wherein the engine controller further includes a first output circuit connected in signal communication with and between the first processing system, the first watchdog circuit, and the fuel control unit, the first output circuit operable to receive the shutdown signal from the first protection circuit and, in response to receiving the shutdown signal, control the fuel control unit to stop fuel flow to the combustor.

13. The propulsion system of claim 11, wherein the motor control unit includes a motor control unit channel, the motor control unit channel is connected in signal communication with the first processing system, the motor control unit channel is operable to receive a control signal output from the first processing system and, in response to the received control signal output, control the motor control unit to supply electrical power to the electric motor.

14. The propulsion system of claim 13, wherein the UHT protection assembly includes a deenergization circuit at the motor control unit, the deenergization circuit is connected in signal communication with the first protection circuit, the deenergization circuit is operable to receive the shutdown signal from the first protection circuit and, in response to receiving the shutdown signal, control the motor control unit to deenergize the electric motor.

15. The propulsion system of claim 11, wherein the first protection circuit is operable to generate and transmit a reset signal to the first processing system in response to identifying the presence of the UHT condition.

16. A propulsion system for an aircraft, the propulsion system comprising:

a propulsor;

a gear box coupled with the propulsor;

an engine including an engine output shaft, a combustor, and a fuel system, the engine output shaft coupled with the propulsor by the gear box, the fuel system connected in fluid communication with the combustor, the fuel system including a fuel control unit operable to control fuel flow from the fuel system to the combustor;

an electrical assembly including an electric motor and a motor control unit, the electric motor coupled with the propulsor by the gear box, the motor control unit electrically connected with the electric motor;

an engine controller including a first controller channel, the first controller channel includes a first processing system, the first processing system operable to control the fuel control unit to direct fuel to the combustor and to control the motor control unit to direct electrical power to the electric motor;

a sensor assembly including at least one propulsor sensor disposed at the propulsor; and an uncontrollable high thrust (UHT) protection assembly including a first protection circuit of the first controller channel, the first protection circuit connected in signal communication with the at least one propulsor sensor, the first protection circuit operable to identify a presence or an absence of a UHT condition of the propulsor in response to one or both of a propulsor rotation speed or a propulsor torque from the at least one propulsor sensor and, in response to identifying the presence of the UHT condition, generate a shutdown signal for the fuel control unit and the motor control unit.

17. The propulsion system of claim 16, wherein the motor control unit includes a motor control unit channel, the motor control unit channel is connected in signal communication with the first processing system, the motor control unit channel is operable to receive a control signal output from the first processing system and, in response to the received control signal output, control the motor control unit to supply electrical power to the electric motor.

18. The propulsion system of claim 17, wherein the UHT protection assembly includes a deenergization circuit at the motor control unit, the deenergization circuit is connected in signal communication with the first protection circuit, the deenergization circuit is operable to receive the shutdown signal from the first protection circuit and, in response to receiving the shutdown signal, control the motor control unit to deenergize the electric motor.

19. The propulsion system of claim 16, wherein the engine controller further includes a second controller channel including a second processing system, the second processing system operable to control, in combination with the first processing system, the fuel control unit to direct fuel to the combustor.

20. The propulsion system of claim 16, wherein the first protection circuit is operable to generate and transmit a reset signal to the first processing system in response to identifying the presence of the UHT condition.

* * * * *